May 26, 1936.  R. W. WEBSTER  2,042,032
MOUNTING OF THERMOGRAPHS ON STERILIZERS
Filed Dec. 5, 1934

INVENTOR
Ralph W. Webster
BY
ATTORNEY

Patented May 26, 1936

2,042,032

UNITED STATES PATENT OFFICE 2,042,032

MOUNTING OF THERMOGRAPHS ON STERILIZERS

Ralph Waldo Webster, London, England

Application December 5, 1934, Serial No. 756,191
In Great Britain July 11, 1934

1 Claim. (Cl. 73—52)

In well known apparatus for the pasteurization and sterilization of bottled liquids, such as beer or milk, and foodstuffs such as jams or the like, the bottles are commonly conveyed on carriers mounted on endless chains which traverse a series of tanks containing water of varying and usually increasing temperatures so that the bottles are thoroughly sterilized.

In order to ascertain that the process of sterilization is adequately effected it is customary to mount on one of the carriers a recording thermometer or thermograph that automatically records the variations of temperature in the liquid contained in the bottles being pasteurized or sterilized and the object of the present invention is to provide a method of mounting such an instrument so that the same is unaffected by the rotation of the carrier and a true record is therefore inscribed by the stylus on the recording drum or disc.

With this object according to the present invention the thermometer or thermograph is so mounted on the carrier that it automatically assumes, and is maintained in, a true recording position irrespective of the rotary or other movement of the carrier.

The accompanying drawing illustrates one method of carrying out the invention applied by way of example to a standard type of travelling recording thermometer mounted on a bottle carrier of the kind comprising a series of cells or pockets each adapted to receive one bottle and permit of its inversion during transit through the tanks. Similar reference letters relate to corresponding parts in both figures of the drawing in which:—

Figure 1:
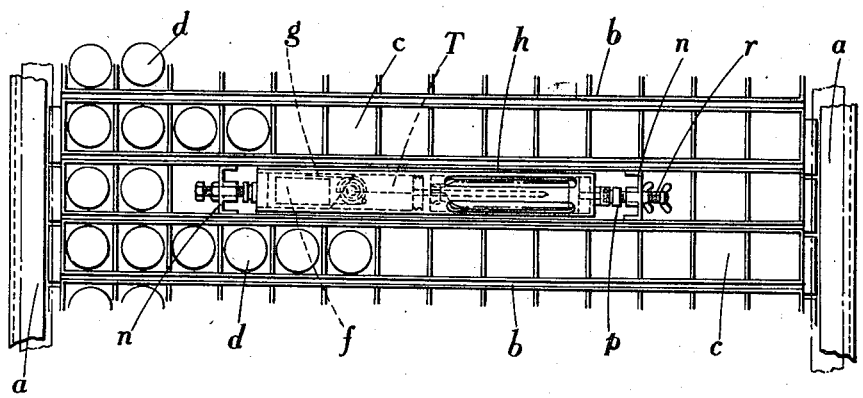
Figure 1 is a plan view showing a portion of the bottle conveyor.
Figure 2:
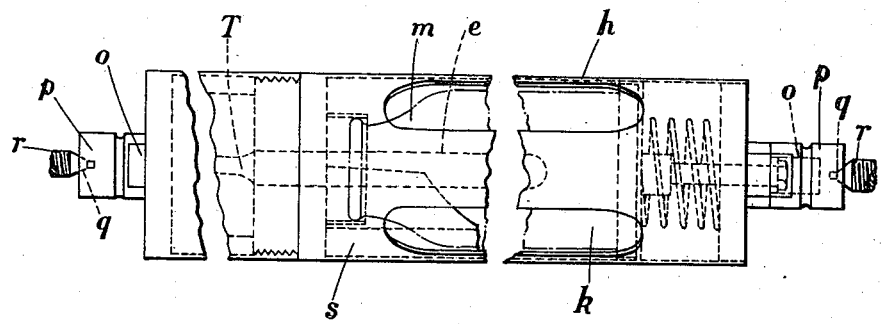
Figure 2 shows the recording thermometer to a larger scale.

Referring to the drawing reference letter $a$ represents the conveyor chains carrying a series of bottle carriers $b$ divided into cells or pockets $c$ each adapted to take one bottle $d$.

In the example illustrated a standard type of travelling recording thermometer T is shown with bulb $e$, recording drum $f$ and stylus $g$ all enclosed in a casing $h$ having openings $k$ therein at one end to place the bottle $m$ suspended in the casing $h$ in communication with the sterilizing liquid as is the usual practice.

In mounting the thermometer T in a carrier $b$ according to the present invention a convenient number of the cell partitions are removed and two channel supports $n$ are fixed in the carrier at a suitable distance apart to suit the length of the casing $h$.

On the usual fittings $o$ at the ends of the casing $h$ are mounted the centering discs $p$ with countersunk centres $q$ adapted to be engaged by the correspondingly shaped ends of the set screws $r$ carried by the channels $n$. The thermometer T in its casing $h$ is thus suspended in the carrier on two points and is free to swing or even rotate relatively to and independent of the carrier but a weight $s$ is inserted in the casing $h$ to ensure that the casing always automatically assumes the correct position for true recording with the stylus.

It may be emphasized that the construction shown on the drawing is given merely by way of example, the invention being applicable to any standard type of travelling recording thermometer employed in connection with pasteurizing apparatus and that can be mounted in the manner described so that a true record is always obtained irrespective of the movement of the bottle carrier, tray or basket.

What I claim is:—

In combination with a bottle carrier for use in a pasteurizing machine wherein the carrier is subjected to reversal, of a thermograph pendulously mounted in the carrier within the bottle carrying area thereof whereby it may partake of independent movement with respect to the carrier to maintain the thermograph in a predetermined recording position regardless of carrier movement.

RALPH WALDO WEBSTER.